US 012455853B2

(12) United States Patent
Elsebø et al.

(10) Patent No.: US 12,455,853 B2
(45) Date of Patent: Oct. 28, 2025

(54) SHARED ITEM FILE RETENTION

(71) Applicant: Microsoft Technology Licensing, LLC, Redmond, WA (US)

(72) Inventors: Kristian Elsebø, Tromsø (NO); Vegar Johan Pettersen, Tromsø (NO); Børge Lanes, Tromsø (NO); Audun Østrem Nordal, Tromsø (NO); Håkon Bergland Brugård, Tromsø (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 315 days.

(21) Appl. No.: 17/879,717

(22) Filed: Aug. 2, 2022

(65) Prior Publication Data

US 2023/0305997 A1    Sep. 28, 2023

Related U.S. Application Data

(60) Provisional application No. 63/323,023, filed on Mar. 23, 2022.

(51) Int. Cl.
*G06F 16/11* (2019.01)
*G06F 16/17* (2019.01)
*G06F 21/62* (2013.01)

(52) U.S. Cl.
CPC .......... *G06F 16/125* (2019.01); *G06F 16/173* (2019.01); *G06F 21/6218* (2013.01)

(58) Field of Classification Search
CPC ... G06F 16/125; G06F 16/173; G06F 21/6218
See application file for complete search history.

(56) References Cited

U.S. PATENT DOCUMENTS 8,417,673 B2    4/2013    Stakutis et al.
8,479,284 B1 *  7/2013    Cooley ............... H04L 63/1408
                                               707/726

(Continued)

FOREIGN PATENT DOCUMENTS

WO    2009158108 A2    12/2009
WO    2014063030 A1    4/2014

OTHER PUBLICATIONS

Bailey, et al., "Learn About Retention Policies and Retention Labels", Retrieved from: https://web.archive.org/web/20220503122921/https://docs.microsoft.com/en-us/microsoft-365/compliance/retention?view=o365-worldwide, Apr. 20, 2022, 29 Pages.

(Continued)

*Primary Examiner* — Marc S Somers
(74) *Attorney, Agent, or Firm* — Novo TechIP International PLLC

(57) ABSTRACT

The disclosed technology is generally directed to the retention of online files. An indication that a communication from a first user to a second user includes a reference to an online document is received. Responsive to the indication, via a first processor, a first request for metadata associated with the online document is sent. The first request is based on permissions associated with the second user. A signal is communicated to a second processor such that: if the first request is granted the signal includes the metadata, else the signal includes the reference to the first online document. Via the second processor, responsive to determining that the signal does not include the metadata, a second request for the metadata is made such that the second request has elevated permissions relative to the first request. Via the second processor, the online document is caused to be marked for retention.

20 Claims, 5 Drawing Sheets

(56) References Cited

U.S. PATENT DOCUMENTS

| | | | |
|---|---|---|---|
| 9,158,785 B1 | 10/2015 | Rudkowski et al. | |
| 9,614,796 B2 | 4/2017 | Aleksandrov | |
| 10,164,920 B2 | 12/2018 | Murphy et al. | |
| 11,075,870 B1 | 7/2021 | Baez et al. | |
| 11,232,068 B2 | 1/2022 | Dhanasekaran et al. | |
| 2008/0028017 A1* | 1/2008 | Garbow | G06Q 10/107 709/201 |
| 2010/0011448 A1* | 1/2010 | Wagner | H04L 63/10 709/204 |
| 2012/0151379 A1 | 6/2012 | Schultz | |
| 2012/0278407 A1* | 11/2012 | Meisels | H04L 51/08 709/206 |
| 2014/0040327 A1* | 2/2014 | Onodera | G06F 12/0261 707/813 |
| 2014/0067865 A1* | 3/2014 | Kirigin | H04L 63/168 707/783 |
| 2014/0101434 A1* | 4/2014 | Senthurpandi | G06F 12/1408 713/150 |
| 2017/0124038 A1* | 5/2017 | Upadhyay | G06F 40/166 |
| 2018/0211062 A1* | 7/2018 | Holland | G06F 21/6254 |
| 2019/0286832 A1* | 9/2019 | Szeto | H04W 12/082 |
| 2019/0312881 A1 | 10/2019 | Dasgupta et al. | |

OTHER PUBLICATIONS

"International Search Report and Written Opinion Issued in PCT Application No. PCT/US22/053944", Mailed Date: Apr. 6, 2023, 16 Pages.

* cited by examiner

SHARED ITEM FILE RETENTION

CROSS-REFERENCE TO RELATED APPLICATION(S)

This application claims priority to U.S. Provisional Pat. App. No. 63/323,023, filed Mar. 23, 2022, entitled "SHARED ITEM FILE RETENTION". The entirety of this afore-mentioned application is incorporated herein by reference.

BACKGROUND

A user may access a user device to share a file with a recipient's user device using an electronic communication. The file may be communicated as a reference, wherein the content of the file may be stored or accessible separate from the electronic communication. As compared to a scenario in which the electronic communication comprises the content of the file (e.g., as an attachment), it may be difficult to provide search, retrieval, and other functionality for a file that was merely communicated as a reference.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The disclosed technology is generally directed to the retention of online files. In some examples, an indication that a communication from a first user to a second user includes a reference to a first online document is received. In some examples, responsive to the indication, via a first processor, to an online document manager, a first request for metadata that is associated with the first online document is sent, such that the first request is based on permissions associated with the second user. In some examples, a first signal is communicated to a second processor such that: if the first request is granted the first signal includes the metadata, else the first signal includes the reference to the first online document. In some examples, via the second processor, responsive to receiving the first signal, whether the first signal includes the metadata is determined. In some examples, via the second processor, responsive to determining that the first signal does not include the metadata, a second request for the metadata from the online document manager is made such that the second request has elevated permissions relative to the first request. In some examples, via the second processor, the first online document is caused to be marked for retention.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
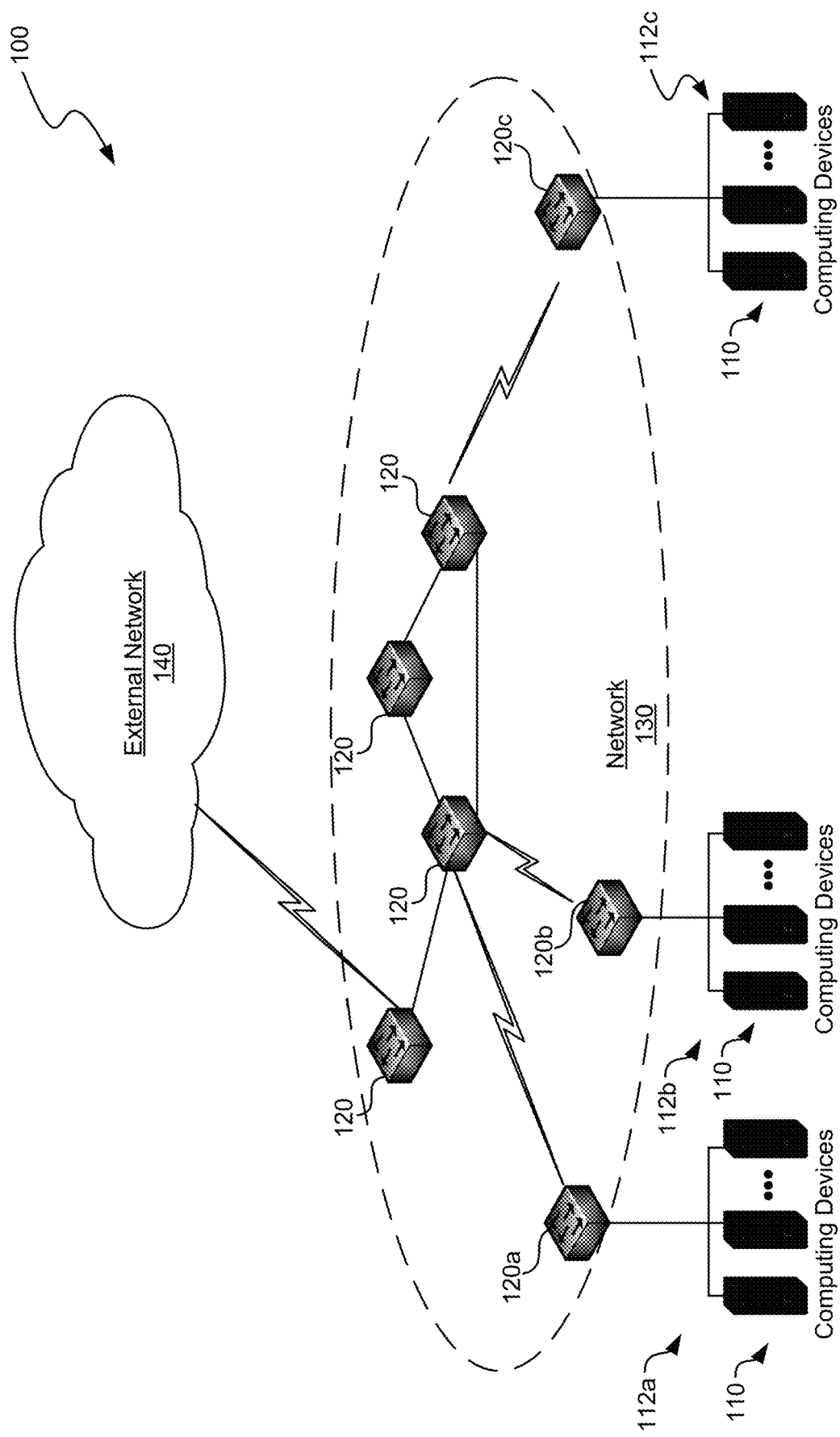
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on," and includes the option of being based on additional factors, some of which may not be described herein. As another example, the term "via" is not exclusive, and is equivalent to the term "via, at least in part," and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "cloud" or "cloud computing" refers to shared pools of configurable computer system resources and higher-level services over a wide-area network, typically the Internet. "Edge" devices refer to devices that are not themselves part of the cloud, but are devices that serve as an entry point into enterprise or service provider core networks.

The disclosed technology is generally directed to the retention of online files. In some examples, an indication that a communication from a first user to a second user includes a reference to a first online document is received. In some examples, responsive to the indication, via a first processor, to an online document manager, a first request for metadata that is associated with the first online document is sent, such that the first request is based on permissions associated with the second user. In some examples, a first signal is communicated to a second processor such that: if the first request is granted the first signal includes the metadata, else the first signal includes the reference to the first online document. In some examples, via the second processor, responsive to receiving the first signal, whether the first signal includes the metadata is determined. In some examples, via the second processor, responsive to determining that the first signal does not include the metadata, a second request for the metadata from the online document manager is made such that the second request has elevated permissions relative to the first request. In some examples, via the second processor, the first online document is caused to be marked for retention.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices no shown in FIG. 1 may be in various locations, including a local computer, on premise, in the cloud, or the like. For example, computer devices no may be on the client side, on the server side, or the like.

As shown in FIG. 1, network 130 can include one or more network nodes 120 that interconnect multiple computing devices no, and connect computing devices no to external network 140, e.g., the Internet or an intranet. For example, network nodes 120 may include switches, routers, hubs, network controllers, or other network elements. In certain examples, computing devices no can be organized into racks, action zones, groups, sets, or other suitable divisions. For example, in the illustrated example, computing devices no are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices no and external network 140. In other examples, multiple host sets 112a-112c may share a single network node 120. Computing devices no may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices no may be individually configured to provide computing, storage, and/or other suitable computing services.

In some examples, one or more of the computing devices no is a device that is configured to be at least part of a process for online file retention.

Illustrative Computing Device

Figure 2:
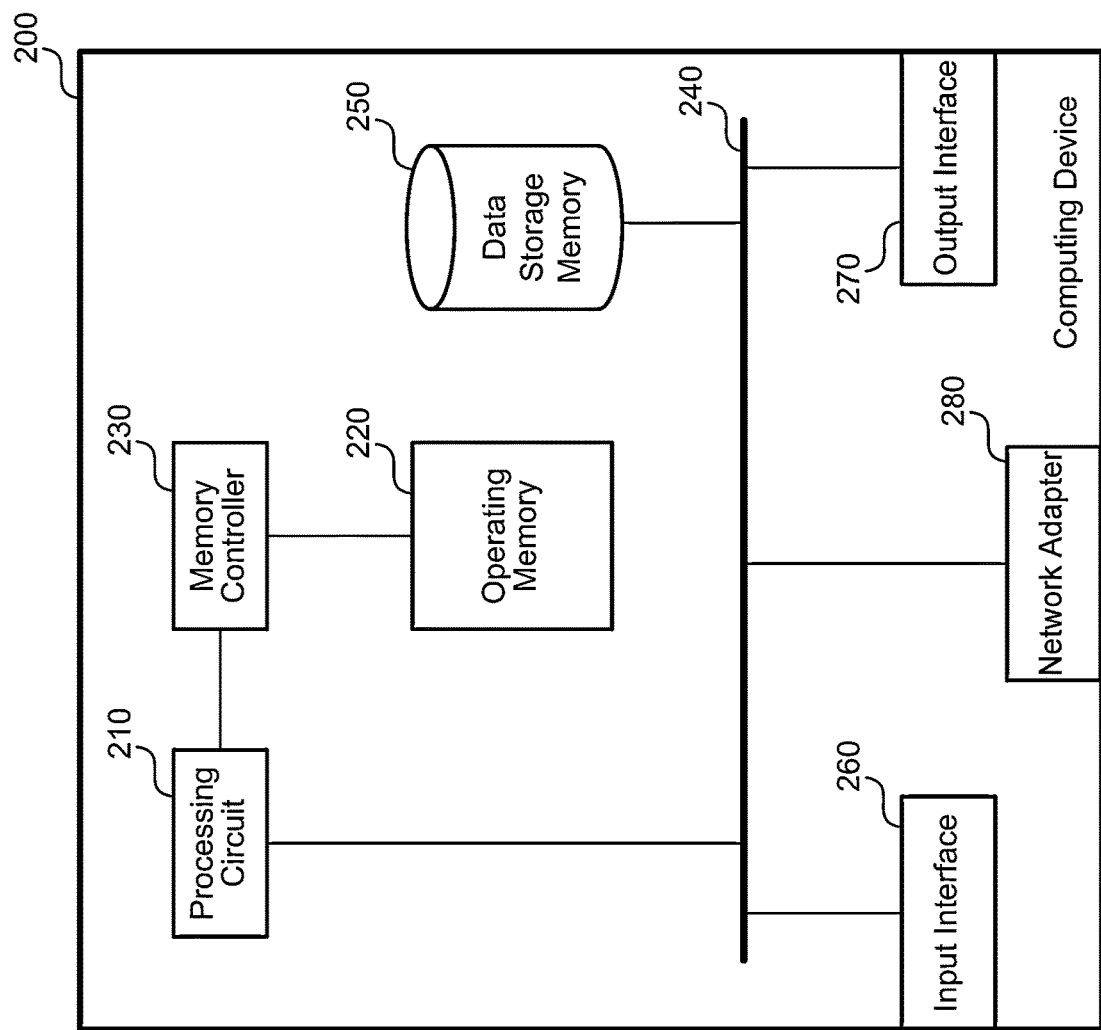
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be a server device such as an application server computer, a virtual computing host computer, or a file server computer, e.g., computing device 200 may be an example of computing device 110 or network node 120 of FIG. 1. Likewise, computer device 200 may be an example any of the devices, a device within any of the distributed systems, illustrated in or referred to in any of the following figures, as discussed in greater detail below. As illustrated in FIG. 2, computing device 200 may include processing circuit 210, operating memory 220, memory controller 230, bus 240, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage component 250, e.g., eXecute In Place (XIP).

Operating memory 220 may include 4th generation double data rate (DDR4) memory, 3rd generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although FIG. 2 illustrates bus 240 as a single passive bus, other configurations, such as a collection of buses, a collection of point-to-point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for runtime data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter (UART), a Serial Peripheral Interface (SPI), Inter-Integrated Circuit (I2C), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long-Term Evolution (LTE) adapter, SigFox, LoRa, Powerline, or a 5G adapter.

Although computing device 200 is illustrated with certain components configured in a particular arrangement, these components and arrangements are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Figure 5:
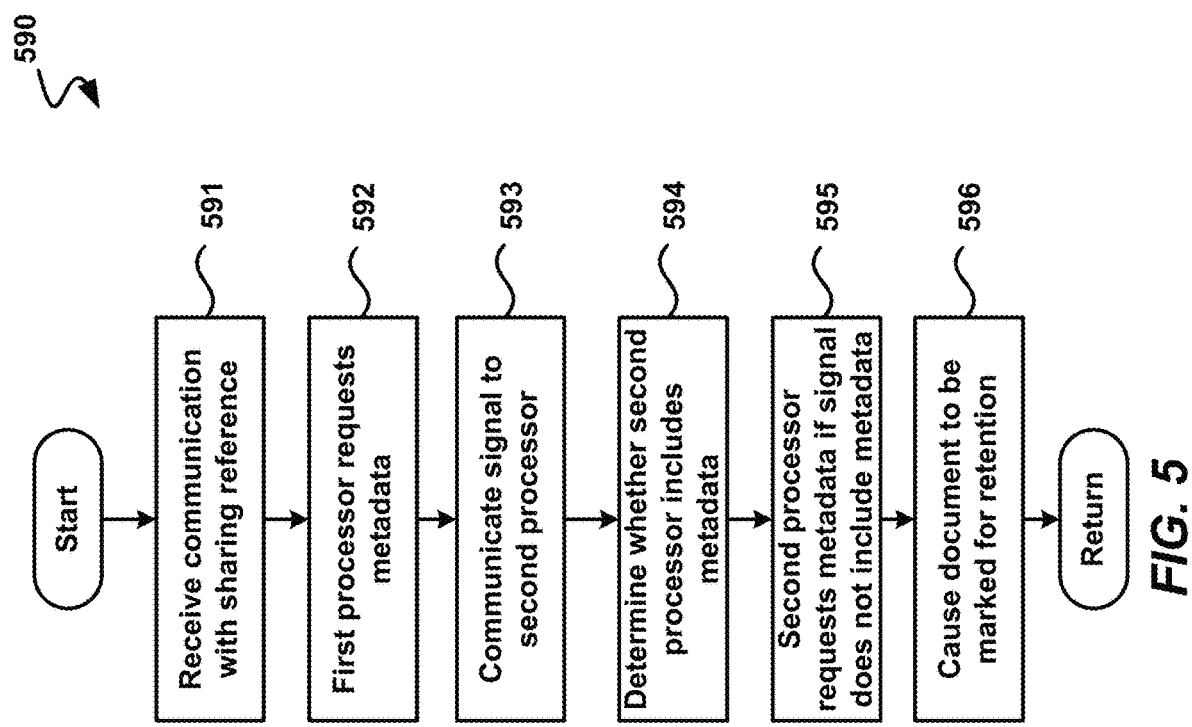
FIG. 5 is a flow diagram illustrating an example process for online file retention, in accordance with aspects of the disclosure.

Some examples of computing device 200 include at least one memory (e.g., operating memory 220) having processor-executable code stored therein, and at least one processor (e.g., processing unit 210) that is adapted to execute the processor-executable code, wherein the processor-executable code includes processor-executable instructions that, in response to execution, enables computing device 200 to perform actions, where the actions may include, in some examples, actions for one or more processes described herein, such as the process shown in FIG. 5, as discussed in greater detail below.

Illustrative Systems

Figure 3:
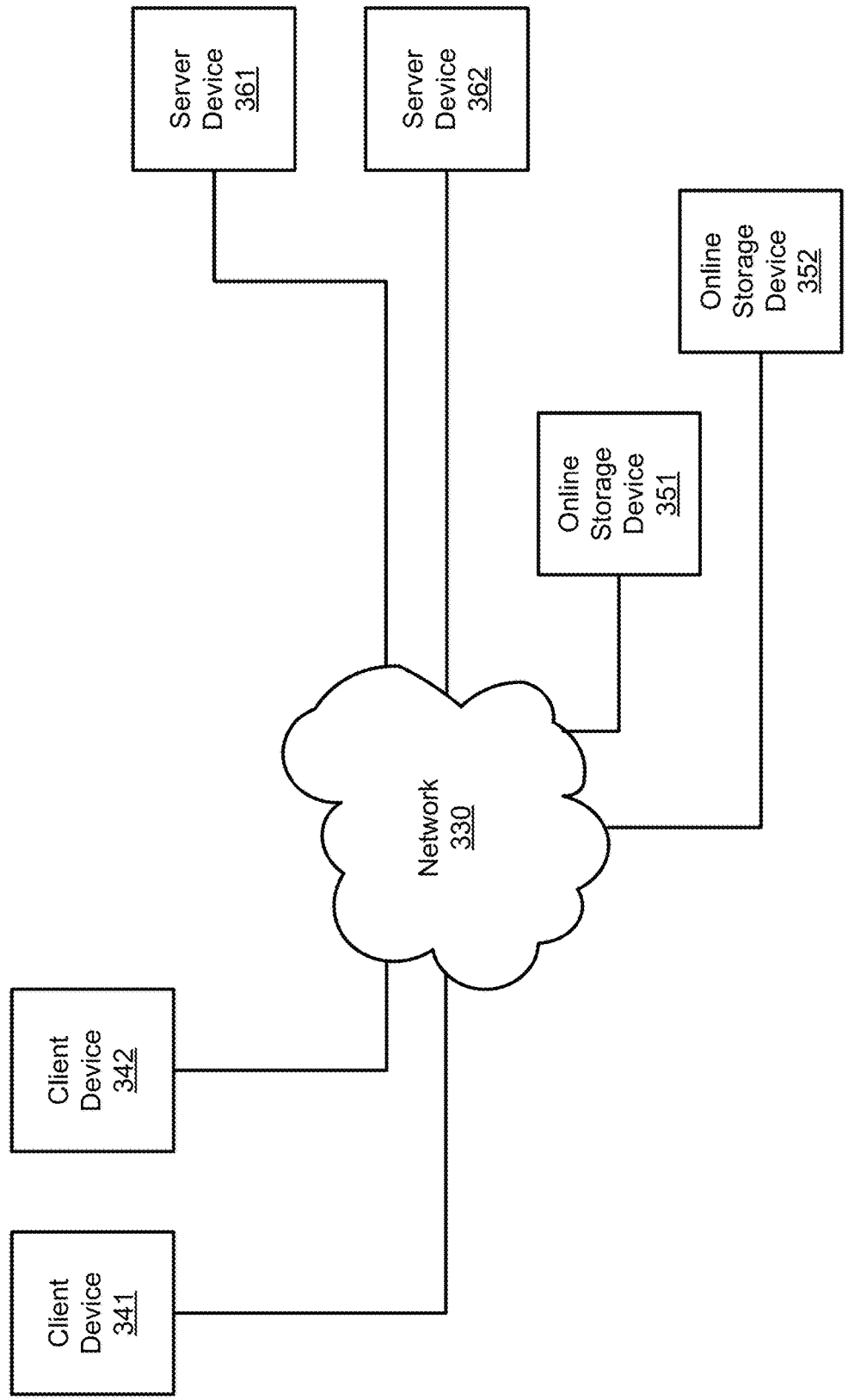
FIG. 3 is a block diagram illustrating an example of a network-connected system.

FIG. 3 is a block diagram illustrating an example of a system (300). System 300 may include network 330, as well as client devices 341 and 342; online storage devices 351 and 352, and server devices 361 and 362, which, in some examples, all connect to network 330.

Each of client devices 341 and 342, online storage devices 351 and 352, and server devices 361 and 362 may include examples of computing device 200 of FIG. 2. FIG. 3 and the corresponding description of FIG. 3 in the specification illustrate an example system for illustrative purposes that does not limit the scope of the disclosure. In some examples, online storage devices 351 and 352 are part of one or more distributed systems, and server devices 361 and 362 are part of one or more distributed systems.

In some examples, online storage devices 351 and 352 may be part or all of one or more online storage services that provide online storage on behalf of users. In some examples, server devices (including, e.g., server devices 361 and 362) provide one or more services on behalf of users. In some examples, the services may include one or more productivity, communication, and/or collaboration tools and/or applications. In some examples, the services may provide access to one or more programs such as, for example, a word-processing program, a spreadsheet program, a presentation program, a note-taking program, a database management program, an electronic form program, an online calendar, and one or more communication programs such as an email program, chat program, instant messaging program, social network program, and/or the like. In some examples, the services may also include management of online storage on the online storage devices (e.g., online storage devices 351 and 352) on behalf of users. In some examples, users may use client devices, e.g., client devices 341 and 342, to make use of the services.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. In essence, network 330 may include any suitable network-based communication method by which information may travel among client devices 341 and 342, online storage devices 351 and 352, and server devices 361 and 362. Although each device is shown connected as connected to network 330, that does not necessarily mean that each device communicates with each other device shown. In some examples, some devices shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown instead communicating with each other with a different network of the multiple networks.

System 300 may include more or less devices than illustrated in FIG. 3, which is shown by way of example only.

Figure 4:
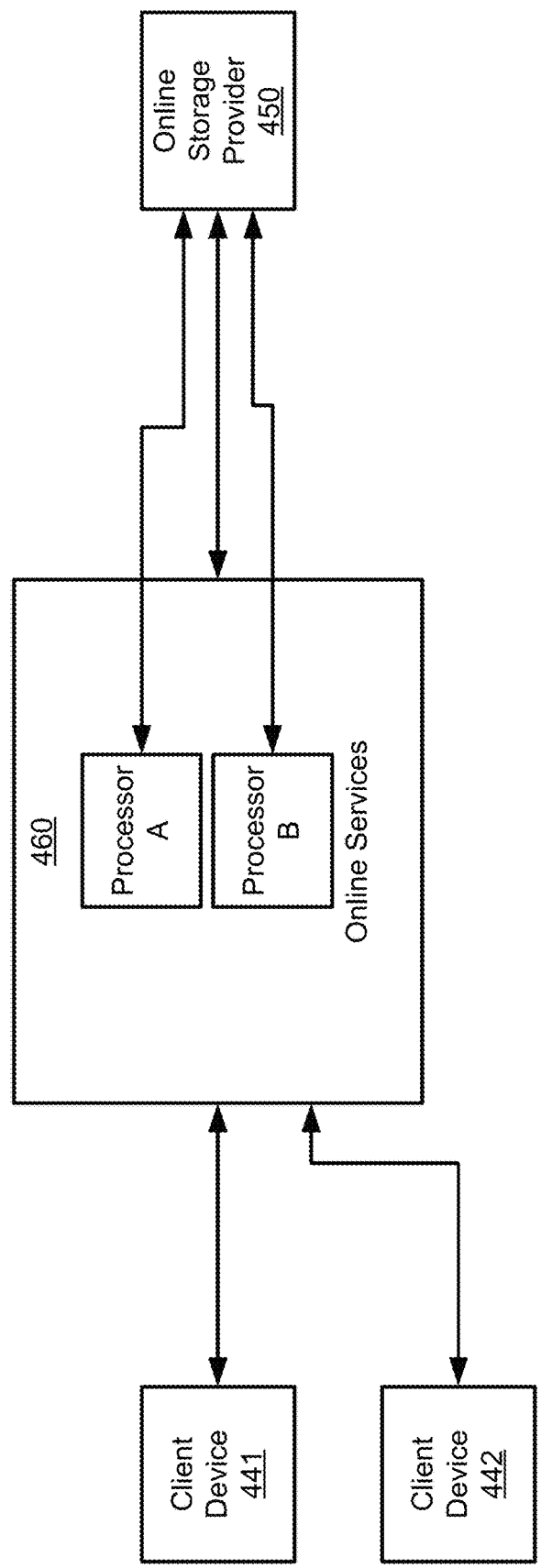
FIG. 4 is a block diagram illustrating an example of a system for online file retention.

FIG. 4 is a block diagram illustrating an example of a system (400). System 400 may be an example of a portion of system 300 of FIG. 3. System 400 may be a system for online file retention. System 400 may include client device 441, client device 442, online storage provider 450, and online services 460. In some examples, online services 460 includes processor A and processor B. Client devices 441 and 442 may be examples of client devices 341 and 342 of FIG. 3. Online services 460 may include one or more distributed systems that include one or more server devices, such as examples of server devices 361 and 362 of FIG. 3. Online storage provider 450 may include one or more distributed systems that includes one or more online storage device, such as examples of online storage device 351 and 352 of FIG. 3.

In some examples, online storage provider 450 may provide online storage on behalf of users. In some examples, the services in online services 460 may be provided by one or more productivity, communication, and/or collaboration tools and/or applications. In some examples, the services in online services 460 may provide access to one or more programs such as, for example, a word-processing program, a spreadsheet program, a presentation program, a note-taking program, a database management program, an electronic form program, an online calendar, one or more communication programs such as an email program, chat program, instant messaging program, social network program, and/or the like. In some examples, the services in online services 460 may also include management of online storage on online storage provider 450 on behalf of users. In some examples, users may use client devices, e.g., client devices 441 and 442, to make use of online services 460. In some examples, online services 460 is a multi-tenant service, and each user is associated with a particular tenant. In other examples, online services 460 is not based on tenants.

As discussed above, online services 460 may include one or more services that enable communication between users, such as email, chat, or the like. In some examples, online services 460 may enable one or more files stored in online storage services 450 to be communicated between users. The file may be communicated via some type of attachment, via some kind of reference to the file such as a URL link, other suitable link, a file path, a unique identifier of the file, a hash, or the like. This communication of a file between users is referred to as a "sharing gesture" that indicates that the file is being shared in some fashion. A user that receives a sharing gesture may or may not actually have permission to view the file. In some examples, if a user receives a sharing gesture for a file that the user does not have permission to view, then the user will not be able to access the file.

In some examples, whenever there is a sharing gesture between users, if the user has permission to access the file that is the object of the sharing gesture, then online services 460 creates a shallow representation of the file and makes the shallow representation available to the user that received the sharing gesture. In some examples, the shallow representation of the file is a lightweight placeholder of the file that can be used to surface the file in various relevant experiences for the user, where the shallow representation of the file is easily discoverable by the user and makes the file more easily accessible to the user. The user that received the sharing gesture may be able to use the shallow representation of the file to access the file or information about the file even without ever having accessed or viewed the actual sharing gesture or the communication that included the sharing gesture. The shallow representation may be available as part of the user's experience of online services 460 in a variety of different ways in various examples.

For instance, in some examples, if a user received a link to a word processing document in an email, even if the user did not open the email containing the link, if the user of a word processing program goes to view available word processing documents to open, the word document processing document linked will be one of the available documents to open. In some examples, there is a specific path accessible in each applicable program that indicates files associated with the program that have been shared with the user, and the user can open any such shared items from that path. In some examples, the shallow representation of the file may also be included in the user's mailbox (or other data store associated with the user) for discovery by the user, independent of the communication containing the reference to the file. In some examples, the shallow representation of the file may be discoverable by the user in relevant searches. In some examples, the shallow representation of the file may also be easily accessible and discoverable by the user in various ways within the user's experience in using online services 460, including through various end-user facing products and services provided to the user by online services 460.

In some examples, the shallow representation may include at least a part of the file content of the referenced file. In some examples, unlike the actual file stored by the file service, the shallow representation may act as a lightweight placeholder for the file reference, where at least some file content (e.g., keywords, etc.) stored by the shallow representation may be indexed in order to provide search functionality. Additionally, file attributes (e.g., metadata associated with the file, such as author, creation date, last modification date, file name, file size, etc.) may be associated with the shallow representation (e.g., as one or more attribute nodes).

A message node including message information associated with the electronic communication (e.g., message content, sender, recipient(s), sent date and time, domain, etc.) may also be created and associated with the shallow representation in a data store that is associated with the user. The data store associated with the user is the user's mailbox in some examples. Various storage techniques may be used in conjunction with the shallow representation, such as a graph database (e.g., nodes and associations), a search index, a relational database, or the like.

The shallow representation may later be accessed based on the file identifier or as a result of matching file content and/or file attributes (e.g., within the shallow representation) or matching message information (e.g., within a message node associated with the shallow representation) to a search query. Electronic communications relating to the shallow representation may be identified based on identifying message nodes that are associated with the shallow representation in the data store. As a result, a user may access electronic communications relating to a file reference based on the nodes and associations of the data store. Thus, the content of an electronic communication including the file reference may be accessible to the user, even though a search query returning the electronic communication may have matched file content, file attributes, etc., that were not incorporated within the electronic communication itself, but rather were associated with a file reference to a file stored by a file service. Further, the searchable content stored by shallow representations of the data store may enable a user to more easily locate files, as compared to merely searching based on a file reference mentioned in an electronic communication.

Some users may have an obligation to retain certain shared files. This obligation may have come in various forms, such as a company policy, a legal obligation, or other form of obligation. For instance, in the United States, broker-dealers in the financial services industry have a requirement to retain an electronic correspondence for a particular number of years under the Security and Exchange Commission (SEC) Rule 17a-4.

In some examples, online services 460 has a file retention service to which users can opt in. In some examples, when there is a sharing gesture between users that have opted into the file retention, online services 460 causes the file that is object of the sharing gesture to be marked for retention, to ensure that the file is retained according to the file retention policy and/or requirements to which the users have opted into. In some examples, the file will be marked for retention regardless of whether the user that received the sharing gesture has permission to view the file.

In some examples, the file retention and shallow representation of files that are the object of a sharing gesture between users that have opened into the file retention service is managed as follows. There may be two separate entities in services 460 that can communicate with an online document manager regarding the file that is the object of a sharing gesture. The online document manager may be online storage provider 450, an intermediary device that is communication with online storage provide 450, or other suitable device. In some examples, a first of the two entities communicates to online storage provider 450 as the user that is the receiver of the sharing gesture, using the permissions of that user. In some examples, the second of the two entities communicates to the online storage provider 450 as a system, with elevated access relative to the user, so that the other entities can access information about the file that is the object of the sharing gesture regardless of the user's permissions to access the file. In some examples, the first of the two entities is processor A, and the second of the two entities is processor B; in other examples, the two entities may be entities other than processor A and processor B.

In some examples, the first entity communicates to the second entity information regarding whether the user has permission to access to the file. In some examples, if the user has permission to access the file, online services 460 creates a shallow representation of the file for the user. In some examples, whether the user has permission to access the file or not, the second entity causes the file to be marked for retention. In some examples, the second entity causes the file to be marked for retention based on metadata for the file received by communication with online storage provider 450. In some examples, if the user did not have permission to access the file, then the metadata is received based on the communication of the second entity with online storage provider 450.

In some examples, the file retention and shallow representation may occur more specifically as follows. In these examples, mailboxes are discussed; however, in various examples and in various types of datastores associated with the user, or to a group to which the user belongs, may alternatively be employed. Further, where mailboxes are employed, the mailboxes may be user mailboxes, group mailboxes, or the like.

In some examples, online services 460 manage mailboxes in online services 460 for users, where the mailboxes may be used for one or more types of communication to communicate communication objects between users, where the communication objects may be emails, messages, calendar events, and/or the like. When a communication object is received by a mailbox, in some examples, a determination is made as to whether the communication object is a communication object that includes a sharing gesture that is communicated between users that have opted into the file retention service. This determination may include (1) a determination as to whether the communication object includes a file attachment, and (2) a determination as to whether the communication object includes a link or other applicable reference to a file that is stored in online service provider 450.

The determination may make use of pattern matching techniques to identify links and/or references in the communication object. In some examples, fuzzy or inexact matching may be used, as a file reference or link may vary depending on one or more factors, including, but not limited to, a version number of the document and/or a last-modified time. In some examples, the communication object may include headers, fields, or metadata indicating or including a file reference. In other examples, user input may be received, where the user input may include an indication of a file reference within the communication object.

In some examples, if it is determined that the communication object includes a sharing gesture that is communicated between users that have opted into the file retention service, an event is dispatched to processor A in online services 460. In response to receiving the event, in some examples, processor A communicates with online storage provider 450 to retrieve metadata for the file that is the object of the sharing gesture. In the communication to online storage provider 450, in some examples, processor A acts as if it were the user that is the intended recipient of the sharing gesture. In some examples, if the user has permission to access the file, then online storage provider 450 communicates metadata regarding the file to processor A. In some examples, if the user does not have permission to access the file, then online storage provider 450 does not send the metadata to processor A. In some examples, if the user does not have permission to access the file, then online storage provider 450 send back to processor A an indication that the user is unauthorized.

The metadata may include various information and/or properties associated with the file. For example, the metadata may include one or more properties associated with the file that may be information associated with one or more of the identity of the file, the location of the file, ownership of the file, the version of the file, how to access the file, and/or the like. For example, the metadata may include the filename of the file, a unique identifier of the file, a site identifier (ID), a web ID, a list ID, information associated with the tenant that owns the document, the URL of the document's location, a URL that describes the path of the file within tenant storage, version information, and/or the like.

In some examples, if the user has permission to access the file, processor A causes a shallow representation of the file to be created if a shallow representation of the file does not already exist, and processor A provides the user with access to the shallow representation of the file. In some examples, regardless of whether the user has permission to view the file, processor A then sends a signal to processor B. In some examples, if the user has permission to access the file, then the signal includes the metadata associated with the file. In some examples, if the user does not have permission to access the file, then the signal instead includes the reference to the file that was included in the sharing gesture.

In some examples, Processor B then receives the signal. In some examples, if the signal does not include metadata for the file, then processor B communicates with online storage provider 450 to retrieve metadata for the file that is the object of the sharing gesture. In some examples, processor B has elevated permissions relative to the user, such that processor B has permission to receive metadata associated with the file regardless of whether the user has permission to access the file. In some examples, online storage provider 450 provides processor B with the requested metadata in response to the request. In some examples, processor B only requests the metadata if processor A was not able to retrieve the metadata. In some examples, this may provide greater efficiency than if processor B were to request the metadata each time a sharing request is received.

Once processor B has received the metadata, whether obtained from processor A or from online storage provider 450, in some examples, processor B uses the metadata to cause the file associated with the sharing gesture to marked for retention. In some examples, a file that is marked for retention is retained in accordance with the associated rules or policies under which the file was marked for retention. In some examples, if a file is marked for retention, then if the file should still be retained according to the associated rules and policies for retention of that file, online storage provider 450 ensures that at least one copy of the file remains stored.

Illustrative Processes

FIG. 5 a diagram illustrating an example dataflow for a process (590) for online file retention.

In the illustrated example, step 591 occurs first. At step 591, in some examples, an indication that a communication from a first user to a second user includes a reference to a first online document is received. As shown, step 592 occurs next in some examples. At step 592, in some examples, in response to the indication, via a first processor, a first request is sent to an online document manager. In some examples, the first request is a request for metadata that is associated with the first online document. In some examples, the first request is based on permissions associated with the second user.

As shown, step 593 occurs next in some examples. At step 593, in some examples, a first signal is communicated from a first processor to a second processor, such that if the first request is granted, the first signal includes the metadata, else the first signal includes the reference to the first online document. As shown, step 594 occurs next in some examples. At step 594, in some examples, via the second processor, responsive to receiving the first signal, whether the first signal includes the metadata is determined. As shown, step 595 occurs next in some examples. At step 595, in some examples, via the second processor, responsive to determining that the first signal does not include the metadata, a second request for the metadata from the online document manager is made such that the second request has elevated permissions relative to the first request. As shown, step 596 occurs next in some examples. At step 596, in some examples, via the second processor, the first online document is caused to be marked for retention (e.g., by marking the first online document for retention or otherwise causing the first online document to be marked for retention). The process may then advance to a return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms.

Accordingly, the actual scope of the technology encompasses not only the disclosed examples, but also all equivalent ways of practicing or implementing the technology.

We claim:

1. An apparatus, comprising:
a device including at least one memory having processor-executable code stored therein, and at least one processor that is adapted to execute the processor-executable code, wherein the processor-executable code includes processor-executable instructions that, in response to execution, enable the device to perform actions, including:
receiving a first signal including information that is associated with a first online document referenced in a communication from a first user to a second user, wherein:
the first signal includes a first indication as to whether the second user has permission to access the first online document,
metadata associated with the first online document if the second user has the permission to access the first online document, and
a reference to the first online document if the second user lacks the permission to access the first online document;
responsive to receiving the first signal, determining, based on the first indication, whether the second user has the permission to access the first online document;
responsive to determining that the second user lacks the permission to access the first online document, making a request for the metadata from an online document manager, wherein the online document manager has an elevated permission level to obtain the metadata relative to the second user;
receiving the metadata by the online document manager, regardless of whether the second user has the permission to access the first online document; and
causing the first online document to be marked for retention responsive to the metadata.

2. The apparatus of claim 1, the actions further including, responsive to the request for the metadata being granted, creating a shallow representation of the first online document.

3. The apparatus of claim 1, wherein the first online document is a document that is associated with at least one of: a word-processing program, a spreadsheet program, a presentation program, a note-taking program, a database management program, an electronic form program, an online calendar, an email program, a chat program, an instant messaging program, or a social network program.

4. The apparatus of claim 1, wherein the communication from the first user to the second user that includes the reference is at least one of an email, a chat message, an instant message, a social network message, or a calendar event.

5. The apparatus of claim 1, wherein the reference to the first online document includes at least one of an attachment of the first online document, a uniform resource locator link to the first online document, a file path to the first online document, a unique identifier of the first online document, or a hash of the first online document.

6. The apparatus of claim 1, wherein the online document manager is a multi-tenant online storage service.

7. A processor-readable storage medium, having stored thereon processor-executable code that, upon execution by at least one processor, enables actions, comprising:
responsive to receiving a first signal, determining whether a receiving user has permission to access a first online document, wherein:
the first signal includes information that is associated with the first online document,
a communication from a sending user to the receiving user includes a sharing gesture that includes a reference to the first online document,
the first signal includes metadata associated with the first online document if the receiving user has the permission to access the first online document, and
the first signal includes the reference to the first online document if the receiving user lacks the permission to access the first online document;
responsive to determining that the receiving user lacks the permission to access the first online document, making a request for the metadata from an online document manager wherein the online document manager has an elevated permission level to obtain the metadata relative to the receiving user;
receiving the metadata by the online document manager regardless of whether the receiving user has the permission to access the first online document; and
causing the first online document to be marked for retention responsive to the metadata.

8. The processor-readable storage medium of claim 7, the actions further comprising, responsive to the request for the metadata being granted, creating a shallow representation of the first online document.

9. The processor-readable storage medium of claim 7, wherein the first online document is a document that is associated with at least one of: a word-processing program, a spreadsheet program, a presentation program, a note-taking program, a database management program, an electronic form program, an online calendar, an email program, a chat program, an instant messaging program, or a social network program.

10. The processor-readable storage medium of claim 7, wherein the communication from the sending user to the receiving user that includes the reference is at least one of an email, a chat message, an instant message, a social network message, or a calendar event.

11. The processor-readable storage medium of claim 7, wherein the reference to the first online document includes at least one of an attachment of the first online document, a uniform resource locator link to the first online document, a file path to the first online document, a unique identifier of the first online document, or a hash of the first online document.

12. The processor-readable storage medium of claim 7, wherein the request is made to a multi-tenant online storage service.

13. A method comprising:
receiving a first signal including information that is associated with a first online document referenced in a communication from a first user to a second user, wherein:
the first signal includes a first indication as to whether the second user has permission to access the first online document,
metadata associated with the first online document if the second user has the permission to access the first online document, and
a reference to the first online document if the second user lacks the permission to access the first online document;

responsive to receiving the first signal, determining, based on the first indication, whether the second user has the permission to access the first online document;

responsive to determining that the second user lacks the permission to access the first online document, making a request for the metadata from an online document manager, wherein the online document manager has an elevated permission level to obtain the metadata relative to the second user;

receiving the metadata by the online document manager, regardless of whether the second user has the permission to access the first online document; and causing the first online document to be marked for retention responsive to the metadata.

14. The method of claim 13, the method further comprising, responsive to the request being granted, creating a shallow representation of the first online document.

15. The method of claim 13, wherein the first online document is a document that is associated with at least one of: a word-processing program, a spreadsheet program, a presentation program, a note-taking program, a database management program, an electronic form program, an online calendar, an email program, a chat program, an instant messaging program, or a social network program.

16. The method of claim 13, wherein the communication from the first user to the second user that includes the reference is at least one of an email, a chat message, an instant message, a social network message, or a calendar event.

17. The method of claim 13, wherein the reference to the first online document includes at least one of an attachment of the first online document, a uniform resource locator link to the first online document, a file path to the first online document, a unique identifier of the first online document, or a hash of the first online document.

18. The method of claim 13, wherein the online document manager is a multi-tenant online storage service.

19. The method of claim 13, further comprising using pattern matching techniques to identify references to documents in the communication, wherein the documents include the first online document.

20. The method of claim 19, wherein the pattern matching techniques include fuzzy matching.

\* \* \* \* \*